United States Patent [19]

Matsuda et al.

[11] 4,364,070

[45] Dec. 14, 1982

[54] DROP JET APPARATUS

[75] Inventors: Yasumasa Matsuda, Hitachi; Syoji Sagae, Hitachiohta; Masatoshi Kasahara, Hitachi; Hiroyasu Uchida, Katsuta, all of Japan

[73] Assignees: Hitachi, Ltd.; Hitachi Koki Co., Ltd., both of Tokyo, Japan

[21] Appl. No.: 280,207

[22] Filed: Jul. 6, 1981

[30] Foreign Application Priority Data

Jul. 4, 1980 [JP] Japan .................................. 55-90589

[51] Int. Cl.[3] .......................................... G01D 15/18

[52] U.S. Cl. .............................................. 346/140 R

[58] Field of Search .................................. 346/140 R

[56] References Cited

U.S. PATENT DOCUMENTS 4,189,734 2/1980 Kyser .......................... 346/140 R X

*Primary Examiner*—Joseph W. Hartary

*Attorney, Agent, or Firm*—Antonelli, Terry and Wands

[57] ABSTRACT

A drop jet apparatus has a nozzle head which defines a pressure chamber, a nozzle, and passages. Part of the pressure chamber is defined by a thin diaphragm which is made thick at the central and at a surrounding portion spaced from the central portion. A piezoelectric plate is adhered to the thick portions so as to bridge the thin portion between the projections.

9 Claims, 8 Drawing Figures

DROP JET APPARATUS

BACKGROUND OF THE INVENTION

This invention relates to a drop jet apparatus, and more particularly relates to a nozzle head suitable for an ink-jet printing apparatus in which the volume of the pressure chamber is changed in response to electric signals and ink droplets are jetted according to the volume changes.

In general, a nozzle head of a drop jet apparatus such as an ink-jet printing apparatus comprises a pressure chamber communicating with a liquid reservoir, a nozzle communicating with the pressure chamber for jetting droplets, and an electro-mechanical transducer such as a piezoelectric plate. A part of the pressure chamber is made by a deflective portion or a so-called diaphragm.

One of conventional nozzle heads has a diaphragm made of piezoelectric crystal, and another has a diaphragm on which a piezoelectric plate is adhered at the whole face contacting therewith as shown in FIGS. 2 and 3 of Japanese Laying-open of Patent Application No. 51-35231. In the latter case, evenness of an adhesion layer between the piezoelectric plate and the diaphragm, as well as relative scale and relative position of the piezoelectric plate to the diaphragm influences directly and greatly on the characteristic of drop formation. The nozzle head, therefore, accompanys difficulty in the adhesion work.

In the former case, that is, when the diaphragm proper is made of piezoelectric crystal, it is necessary that the material is not reactant to and stable to a liquid such as an ink and the diaphragm is sealingly adhered to a housing defining the pressure chamber. Such adhering work is not easy, and freedom in the design of the nozzle head is reduced.

SUMMARY OF THE INVENTION

An object of the invention is to provide a drop jet apparatus such as an ink-jet printing apparatus which has a good productivity and a small amount of scattering in the characteristic of drop formation.

Another object of the invention is to provide a drop jet apparatus which has a large freedom in the design, is easy to manufacture, and is able to choose any shape of the piezoelectric plate without being restricted by the shape of a pressure chamber.

Further, another object of the invention is to provide a drop jet apparatus, in which the characteristic of drop formation is not directly influenced by a relative position between a diaphragm defining a pressure chamber and a piezoelectric plate adhered to the diaphragm, and by evenness of the adhesion layer.

A feature of the invention is in that a wall such as a diaphragm defining part of the pressure chamber of a nozzle head has a thick central portion at the center of a thin deflective portion surrounding the thick central portion, and an electro-mechanical transducer such as a piezoelectric plate is disposed on said wall to bridge the thin deflective portion and is secured to the thick central portion and portions surrounding the thin portion. The wall is deflected by the electro-mechanical transducer with the thick central portion being pressed by the deformation of the electro-mechanical transducer. The thin portion of the wall is not contacted with the thin portion so that securing means between the wall and the central projection has little influence the characteristic of drop formation of the nozzle head.

DESCRIPTION OF THE PREFERRED EMBODIMENTS

Figure 1:
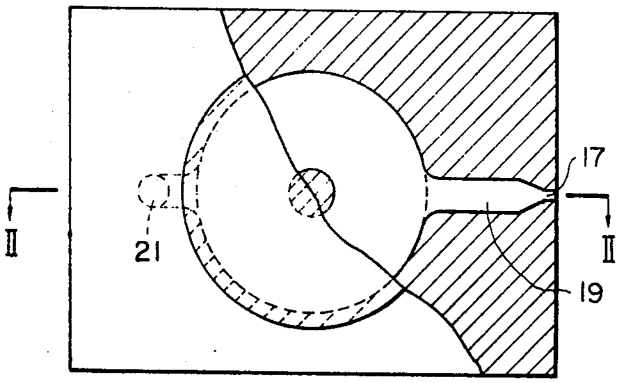
FIG. 1 is a plane view partially broken of an embodiment of a drop jet apparatus according to the invention.
Figure 2:
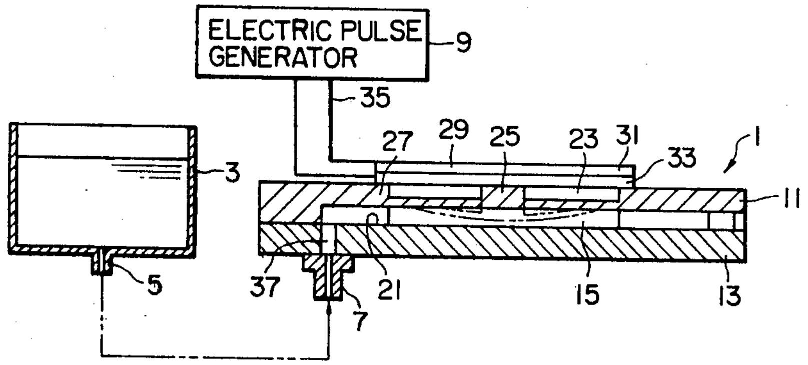
FIG. 2 is a sectional view taken along a line II—II of FIG. 1.

Referring to FIGS. 1, 2, an embodiment of a drop jet apparatus according to the invention will be described hereinafter in detail.

In FIG. 2, a nozzle head 1 is connected to a liquid reservoir such as an ink tank 3 by means of a pipe 5 and connector 7, and injects or jets drops or ink droplets to a recording medium according to electric signals from an electric pulse generator 9.

The nozzle head 1 comprises a housing, constituted by a base plate 11 and a lid member 13 secured thereto, and defining a circular pressure chamber 15, a nozzle 17 and passages 19, 21 for liquid, as shown best in FIG. 1. The pressure chamber 15 communicates with the nozzle 17 through the passages 19 and with the ink tank 3 through passage 21 and the connector 7. A part 23 of the housing or the base plate 11 defining a part of the pressure chamber is made thin and deflective, which is a so-called diaphragm 23. The diaphragm 23 has a projection 25 projected into the outside thereof, and surrounded by a thick and rigid peripheral portion 27. The upper faces of the projection 25 and the peripheral portion 27 are made the same level.

A deflective plate 29, which is made of piezoelectric elements 31, 33 adhered to each other by thin conductive film, and which has a diameter larger than that of the pressure chamber 15, is disposed on and adhered only to the surrounding peripheral portion 27 and the projection 25. The piezoelectric plate 29 is electrically connected to the electric pulse generator 9 by leads 35 and is deflected in response to electric signals, as shown by dotted line.

The base plate 11 has recesses or cavities for defining the nozzle 17, the pressure chamber 15 and the passages 19, 21, and an annular recess for defining the thin flexible diaphragm 23. The lid member has only a hole 37 made for the liquid passage 21. Most of the reduction, therefore, is subjected to the base plate 11, so that the various recesses can be made by etching at the same time. The drop jet apparatus which is high in productivity, and low in cost, therefore, can be provided.

The piezoelectric plate 29 made of Bimorph (trade name) is deformed conically in the pressure chamber with electric signals from the electric pulse generator 9 being applied on the piezoelectric plate 29, and the diaphragm 23 is pressed at the projection 25 and is deformed as shown by the dotted lines. As a result, the pressure chamber 15 is reduced rapidly in volume to elevate the inner pressure of the pressure chamber 15. The pressure raised is transferred to about the nozzle 17 so that droplets are projected from the nozzle 17. Upon disappearance of the electric signals applied on the plate 29, both the plate 29 and the diaphragm 23 are reinstated, and the pressure chamber 15 expands. At the same time as the expansion, ink from the ink tank 3 and the passage 19 flows into the pressure chamber 15, so that the ink in the nozzle 17, is retired temporarily. Then, the nozzle 17 is filled again with ink by capillary action. Consequently, all the amount of ink jetted away from the nozzle 17 is supplied from the ink tank 3.

The piezoelectric plate 29 and the diaphragm 23 are secured to each other only at the peripheral portion and the central portion. Even if adhesion layers between the diaphragm 23 and the piezoelectric plate 29 are uneven, since the unevenness of the adhesion layer does not influence directly the deformation of the piezoelectric plate 29 as well as the deformation of the diaphragm 23, the characteristics of droplets formation is not greatly influenced by the adhesion layers. The change of volume in the pressure chamber 15 is determined by combiantion of an amount of deformation and force of the piezoelectric plate 29, and the stiffness and size of the diaphragm 23, and it is not greatly influenced by the shape of the pressure chamber and the shape and size of the piezoelectric plate as shown in a conventional nozzle head. Therefore, the construction has a large freedom for the design and is easily designed because the piezoelectric plate 29, the diaphragm 23, etc. can be determined individually with respect to its shape, size, etc.

Figure 3:
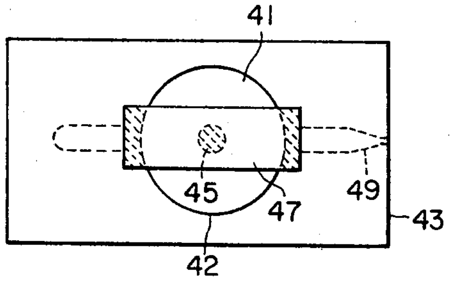
FIG. 3 is a plane view of another embodiment of a nozzle head according to the invention.

Another embodiment of the drop jet apparatus according to the invention will be described hereinafter, referring to FIG. 3 showing only a nozzle head.

In FIG. 3, a pressure chamber 41 formed by a housing 43 and a diaphragm 42 of the housing 43 each are circular. The diaphragm 42 has a projection 45 at the center and is surrounded by a thick portion of the housing 43. A piezoelectric plate 47 made of Bimorph (trade name), is shaped rectangular and is secured to the housing 43 by adhesion at the central projection and the surrounding thick portion.

With this construction of the nozzle head, the deformation of the piezoelectric plate 47 is transmitted to the diaphragm 42 by the projection 45. Volume change of the pressure chamber 41 corresponding to the deformation of the diaphragm 42 takes place, so that a jet operation of a nozzle 49 similar to the above-embodiment is effected.

According to the embodiment, a desired volume change of the pressure chamber 41 is obtained by combination of the deformation and force of the piezoelectric plate 47 and the deformation and stiffness of the diaphragm 42. Therefore, it is not necessary to make the diaphragm 42 and the piezoelectric plate 47 into a similar shape, as shown in FIG. 3.

Figure 4:
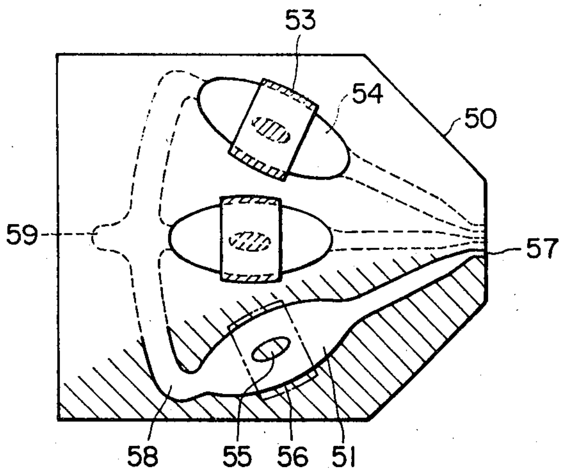
FIG. 4 is a plane view, partially broken, of another embodiment of a nozzle head according to the invention.

FIG. 4 shows an example in which a nozzle head 50 is made of multi nozzle type. The nozzle head 50 is provided with a plurality of pressure chambers 51 of elliptical shape and a plurality of piezoelectric plates 53 of rectangular shape and secured to diaphragms 54 by adhesion at central projections 55 and surrounding peripheral portions 56. The pressure chambers 51 are arranged in parallel therewith, and are connected to nozzles 57, respectively. Passages 58 led to the pressure chamber 51 are gathered by a passage 59 communicating with an ink tank (not shown).

Further another embodiment of a drop jet apparatus according to the invention will be described referring to FIGS. 5 and 6 which show only a pressure chamber of a nozzle head.

Figure 5:
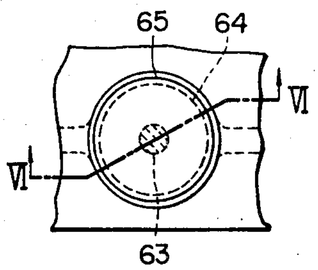
FIG. 5 is a plane view showing another embodiment of a nozzle head according to the invention.
Figure 6:
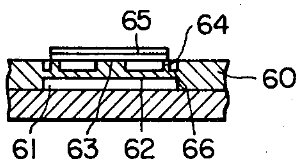
FIG. 6 is a sectional view taken along a line VI—VI of FIG. 5.

In FIG. 6, a base plate 60 has a recess for defining a pressure chamber 61 and a diaphragm 62. The diaphragm 62 is provided with a central projection 63 at the center and an annular projection 64 surrounding the projection 63 with spacing therebetween. The annular projection 64 is disposed inside the thick surrounding wall 66. The central projection 63 and the annular projection 64 are the same level at the upper faces. As shown in FIG. 5, the diaphragm 62 and the piezoelectric plate are formed circular. On them, a piezoelectric plate 65 is disposed and secured to the projections 63 and 64 by adhesion. In this embodiment, since a thin portion is formed between the thick surrounding wall 66 and the annular projection 64, deformation of the piezoelectric plate 65 is prevented from reducing. Namely, the ends of the piezoelectric plate 65 are elastically supported by the annular projection, so that the deformation becomes large. This embodiment is suitable for a nozzle head, wherein the piezoelectric plate has a large deformation force, and the deformation is relatively small.

Figure 7:
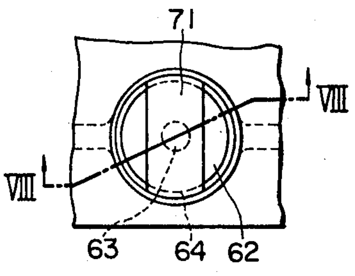
FIG. 7 is a plane view of another embodiment of a nozzle head according to the invention.
Figure 8:
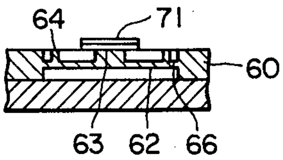
FIG. 8 is a sectional view taken along a line VII—VII of FIG. 7.

FIGS. 7 and 8 show a nozzle head similar to one of FIGS. 5 and 6 except that the piezoelectric plate 71 is of rectangular shape.

According to the invention, the deviation of the position of the piezoelectric plate to the pressure chamber and unevenness of the adhesion layers do not directly influence the performance of drops injected from the nozzle head. The shape of the piezoelectric plate is not necessary to be the same as that of the pressure chamber. Therefore, there can be provided with a drop jet apparatus such as an ink-jet printing apparatus which is easy both in adhesion work and design, less in the scattering of drop formation characteristics, high in productivity and low in cost.

What is claimed is:

1. A drop jet apparatus comprising housing means defining a pressure chamber;

nozzle means communicating with said pressure chamber for jetting drops therethrough;

diaphragm means, included in said housing means for defining a part of said pressure chamber, said diaphragm means having a thick central portion at the center and a thin portion surrounding said thick central portion;

electro-mechanical transducer means, disposed on said housing so as to bridge said thin portion and secured to said diaphragm means at said thick central portion for deforming said diaphragm according to electric signals;

liquid reservoir means communicating with said pressure chamber for storing therein a liquid; and electric signal generator means electrically connected to said electro-mechanical transducer means.

2. The apparatus as defined in claim 1, wherein said diaphragm means includes a thick outer portion spaced from said central portion, and said electro-mechanical transducer means is secured to said both thick portions.

3. The apparatus as defined in claim 2, wherein said thick outer portion is annular, and a thin outer portion is formed between said thick outer portion and a portion of said housing means other than said diaphragm means so that said thick outer portion is deflective.

4. The apparatus as defined in claim 1, wherein said electro-mechanical transducer means is secured to said diaphragm means by means of adhesion.

5. A drop jet apparatus comprising;

a base plate, formed with recesses for a pressure chamber, passages for liquid and a nozzle communicating with said pressure chamber through one of said passages, and having a deflective diaphragm, said deflective diaphragm defining said pressure chamber and having a central projection at the center of the opposite side to the pressure chamber and a thin portion surrounding said central projection;

a piezoelectric plate disposed on and secured to said base plate so as to bridge said thin portion of said diaphragm;

a lid member secured to said base plate so that said pressure chamber, said nozzle and said passages are formed;

a liquid reservoir connected to said pressure chamber; and an electric pulse generator electrically connected to said piezoelectric plate.

6. The apparatus as defined in claim 5, wherein said diaphragm is formed with an annular projection which is deflective, and said piezoelectric plate is secured to said annular projection and said central projection.

7. The apparatus as defined in claim 6, wherein said base plate has recesses formed therein for defining a plurality of pressure chambers, diaphragms, and nozzles, and a plurality of piezoelectric plates are secured to said base plate so that each of said diaphragms is deformed in response to electric signals from said electric pulse generator.

8. The apparatus as defined in claim 6 or 7, wherein said diaphragm is of circular shape and said piezoelectric plate is of rectangular shape.

9. The apparatus as defined in claim 6 or 7 wherein said diaphragm is of elliptical shape, and said piezoelectric plate is of rectangular shape.

* * * * *